(12) United States Patent
Wuest (10) Patent No.: US 7,574,677 B2
(45) Date of Patent: Aug. 11, 2009

(54) SYSTEM AND METHOD FOR A TRANSPARENT RECORD

(75) Inventor: Marco Wuest, Nordheim (DE)

(73) Assignee: SAP AG, Walldorf (DE)

( * ) Notice: Subject to any disclaimer, the term of this patent is extended or adjusted under 35 U.S.C. 154(b) by 838 days.

(21) Appl. No.: 10/940,226

(22) Filed: Sep. 13, 2004

(65) Prior Publication Data

US 2006/0059114 A1    Mar. 16, 2006

(51) Int. Cl.
G06F 3/00    (2006.01)
G06F 3/14    (2006.01)

(52) U.S. Cl. .................... 715/854; 715/853; 715/765; 707/1

(58) Field of Classification Search .................. 715/764, 715/765, 781, 810, 829, 835, 841, 853, 854; 707/1, 9, 100
See application file for complete search history.

(56) References Cited

U.S. PATENT DOCUMENTS

| | | | | |
|---|---|---|---|---|
| 5,584,035 A * | 12/1996 | Duggan et al. | .............. | 715/765 |
| 5,642,490 A * | 6/1997 | Morgan et al. | .............. | 715/762 |
| 5,815,703 A * | 9/1998 | Copeland et al. | ............ | 707/102 |
| 5,878,415 A * | 3/1999 | Olds | .............................. | 707/9 |
| 6,046,739 A * | 4/2000 | MacPhail | ..................... | 715/853 |
| 6,046,740 A * | 4/2000 | LaRoche et al. | ............ | 715/764 |
| 6,091,893 A * | 7/2000 | Fintel et al. | ..................... | 703/6 |
| 6,345,277 B1 * | 2/2002 | Goldman et al. | ............ | 707/100 |
| 6,487,552 B1 * | 11/2002 | Lei et al. | ........................ | 707/4 |
| 6,625,603 B1 * | 9/2003 | Garg et al. | ..................... | 707/9 |
| 7,136,873 B2 * | 11/2006 | Smith et al. | .............. | 707/104.1 |
| 7,149,729 B2 * | 12/2006 | Kaasten et al. | ................. | 707/1 |
| 7,174,517 B2 * | 2/2007 | Barnett et al. | ............... | 715/764 |
| 7,249,235 B2 * | 7/2007 | Sexton et al. | ............... | 711/165 |
| 7,275,063 B2 * | 9/2007 | Horn | .......................... | 707/102 |
| 2002/0091501 A1 * | 7/2002 | Durbin et al. | ............... | 702/188 |
| 2002/0112221 A1 * | 8/2002 | Ferreri et al. | ................. | 716/17 |
| 2004/0088305 A1 * | 5/2004 | Kintzley et al. | ............. | 707/100 |
| 2004/0122789 A1 * | 6/2004 | Ostertag et al. | ................ | 707/1 |
| 2004/0189707 A1 * | 9/2004 | Moore et al. | ................. | 345/777 |

* cited by examiner

*Primary Examiner*—X. L Bautista
(74) *Attorney, Agent, or Firm*—Blakely, Sokoloff, Taylor & Zafman LLP (57) ABSTRACT

Embodiments of the invention are generally directed to a system and method for a transparent record. A record is displayed in a graphical user interface. The record contains at least one container having one or more elements. In an embodiment, a read service accesses a first interface of the container responsive to receiving input selecting the container. The one or more elements of the container are read and displayed in the graphical user interface.

30 Claims, 8 Drawing Sheets

SYSTEM AND METHOD FOR A TRANSPARENT RECORD

TECHNICAL FIELD

Embodiments of the invention generally relate to the field of data processing and, more particularly, to a system and method for a transparent record.

BACKGROUND

The administration of both public and private organizations relies heavily on records that document the work of the organizations. Electronic records are rapidly replacing paper records because they are less expensive, easier to store and retrieve, and simultaneously accessible by any number of users. An electronic record is a collection of related elements presented in a certain structure.

Figure 1:
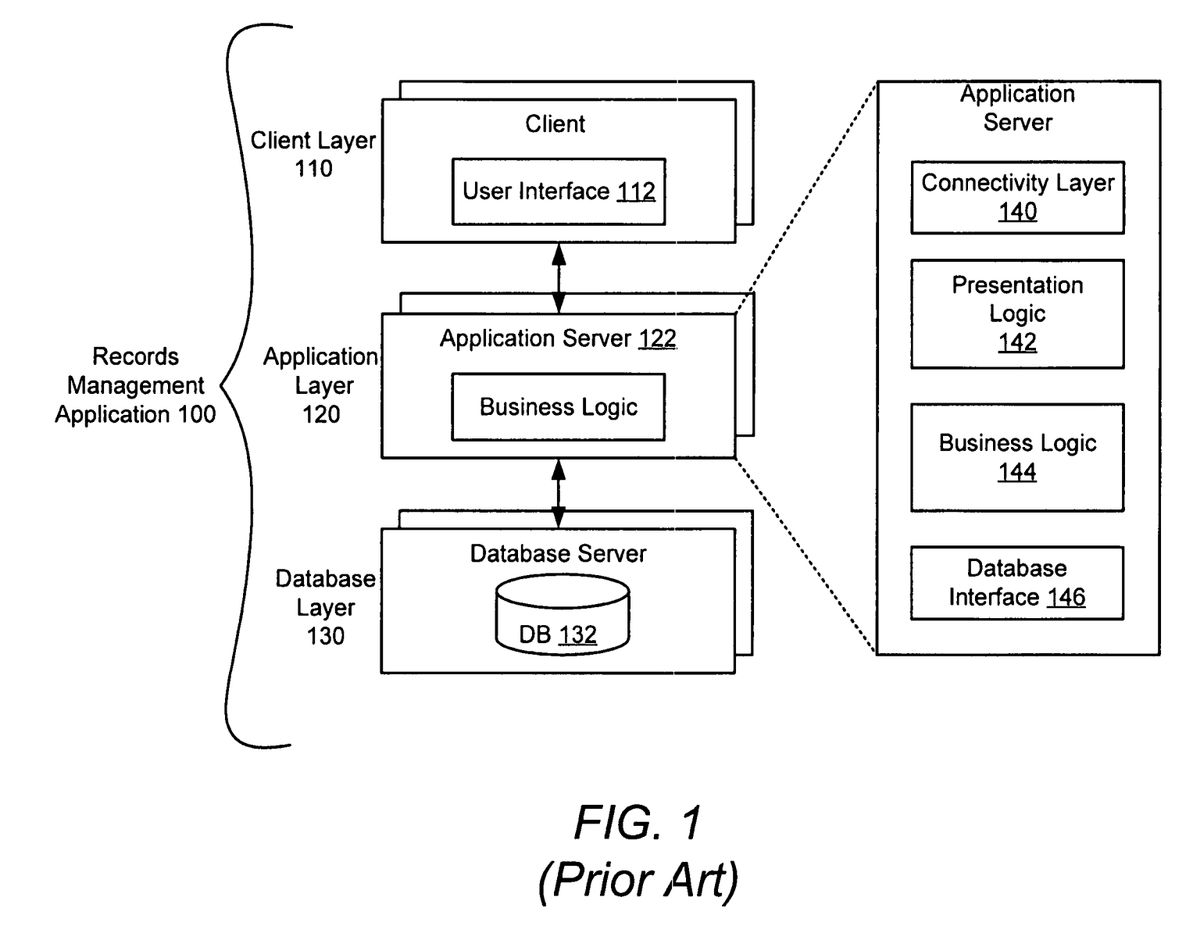
FIG. 1 is a block diagram of a records management application having a multi-tiered architecture.

A "records management application" refers to software for creating, processing, and storing electronic records. These applications typically have a multi-tiered architecture. In those cases where the applications are delivered over the Internet they are commonly referred to as Web-based applications. FIG. 1 is a block diagram of a records management application 100 having a multi-tiered architecture.

Records management application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. The HTTP protocol refers to any of the HTTP protocols including, for example, the protocol described in Request For Comments (RFC) 2616 entitled, "HyperText Transport Protocol—HTTP/1.1" June 1999 (hereinafter, the HTTP protocol). The SOAP protocol refers to any of the SOAP protocols including the one promulgated by the World Wide Consortium (W3C) entitled, "SOAP Version 1.1 Part 1: Messaging Framework and Part 2: Adjuncts," 24 Jun. 2003 (hereinafter, the SOAP protocol). The Secure Socket Layer protocol refers to any of the Secure Socket Layer protocols including, for example, the protocol entitled, "The SSL Protocol Ver. 3.0" Nov. 18, 1996 (the HTTPS protocol).

Presentation logic 142 generates a Graphical User Interface (GUI) using, for example, a markup language such as the Hyper Text Markup Language (HTML) or the eXtensible Markup Language (XML). Business logic 144 represents the core of the application, for example, the rules governing the processing of an electronic record (or other functionality provided by the application). The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data (e.g., electronic records) in database 132. Database 132 provides non-volatile storage (sometimes referred to as a persistent store) for the data accessed and/or processed by application layer 120. Database 132 may be, for example, a relational database or an object-oriented database.

Typically, electronic records are displayed in a graphical user interface of client layer 110. The displayed electronic record may have a hierarchical structure consisting of zero or more elements. One or more of the displayed elements may be another record having its own element structure. The term "nested record" refers to an electronic record that is an element of another electronic element. Conventional record management infrastructures may not provide a transparent mechanism for displaying and modifying the structure of a nested record.

SUMMARY OF THE INVENTION

Embodiments of the invention are generally directed to a system and method for a transparent record. A record is displayed in a graphical user interface. The record contains at least one container having one or more elements. In an embodiment, a read service accesses a first interface of the container responsive to receiving input selecting the container. The one or more elements of the container are read and displayed in the graphical user interface.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a transparent record. A record is displayed in a graphical user interface. The record contains at least one container having one or more elements. In an embodiment, a read service accesses a first interface of the container responsive to receiving input selecting the container. The one or more elements of the container are read and displayed in the graphical user interface.

Figure 2:
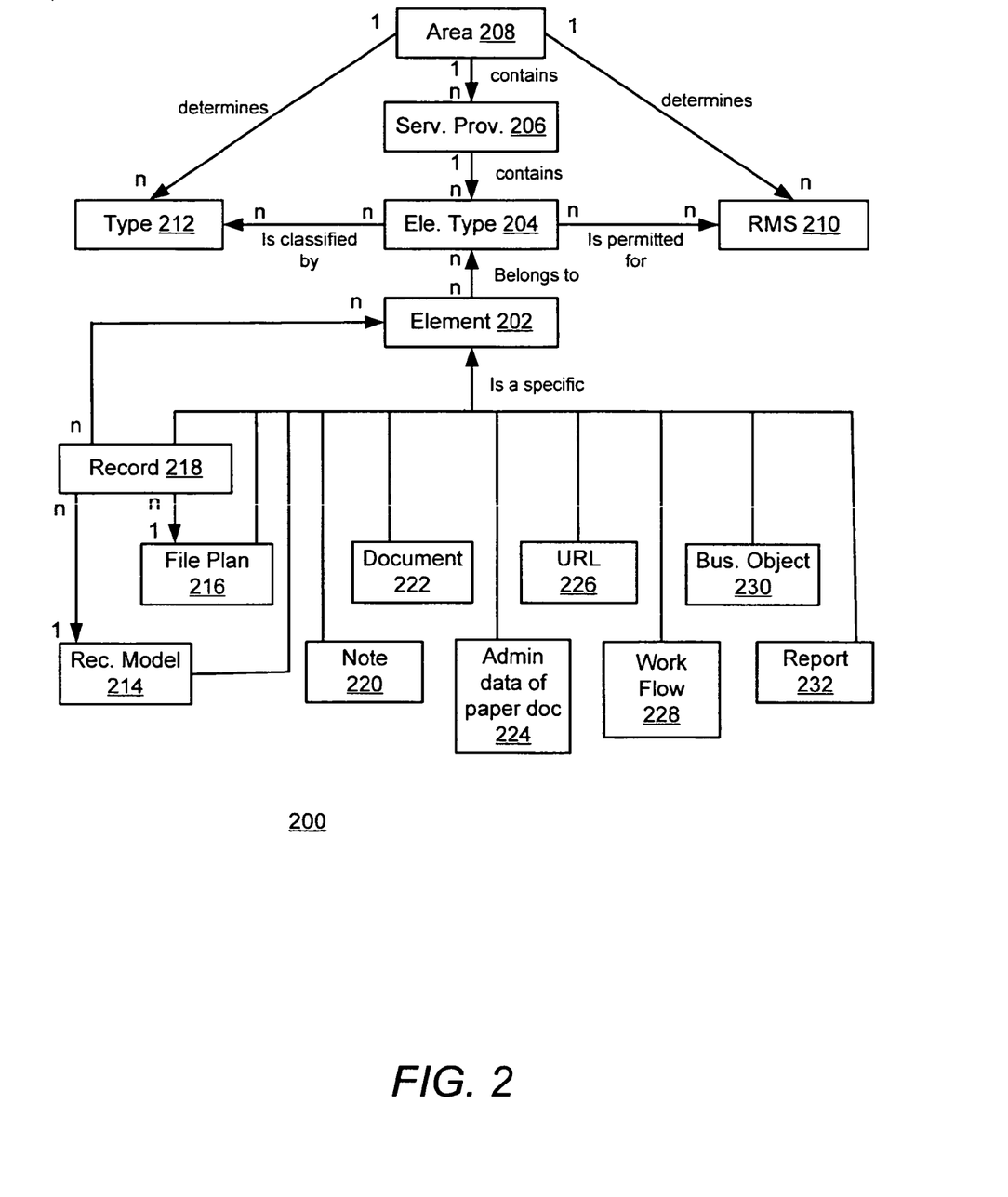
FIG. 2 is an overview of selected aspects of the architecture of a records management application, according to an embodiment of the invention.

FIG. 2 is an overview of selected aspects of the architecture of a records management application 200, according to an embodiment of the invention. In an embodiment, application 200 may be part of a multi-tiered network. The multi-tiered of the layers of the multi-tier architecture, including those based on the Java 2 Enterprise Edition™ ("J2EE") specification (e.g., the Websphere platform developed by IBM Corporation), the Microsoft .NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001. Records management application 200 includes element 202, element type 204, service provider 206, area 208, Records Management System (RMS) 210, and type 212. In an alternative embodiment, records management application 200 may have a different architecture.

Element 202 is an item of information that is checked into application 200. Element 202 may be (but is not required to be) integrated into an electronic record (e.g., record 218). Examples of element 202 include and are not limited to: note 220, document 222, administration data relating to a paper document 224, Uniform Resource Locator (URL) 226, workflow instance 228, business object 230, and report 232. The term "workflow" refers to a process that is followed in response to a predefined event. The term "business object" refers to an instance of a predefined business object type that encapsulates a set of related data and operations.

Element type 204 groups similar elements together. In an embodiment, element type 204 is the starting point for checking in new elements or searching for elements in records management application 200. In one embodiment, element type 204 is a subset of the elements of service provider 206. Service provider 206 provides functionality to integrate each element 202 into records management application 200. In an instance of service provider 206 includes interfaces, methods, and parameters to support the services it provides.

In an embodiment, RMS 210 is used to divide the records of application 200 into discrete units (e.g., personnel records and customer records). Dividing records into discrete units makes it possible to provide particular groups of users with access to particular records. For example, a hospital maintains personnel records and patient records. A records management application for the hospital may have a first RMS for personnel records and a second RMS for patient records. Hospital administrators may have access to the first RMS and medical professionals may have access to the second RMS.

Area 208 provides a framework for one or more service providers 206. In an embodiment, area 208 defines attributes for the element types 204 contained in service providers 206. Type 212 classifies elements 202 according to their semantic content (e.g., document, record model, etc.). Record model 214 defines the structure of record 218. Typically, a records management application includes a number of different record models 214 each defining a different record 218. File plan 216 is a central registry used for the management of records 218.

Figure 3:
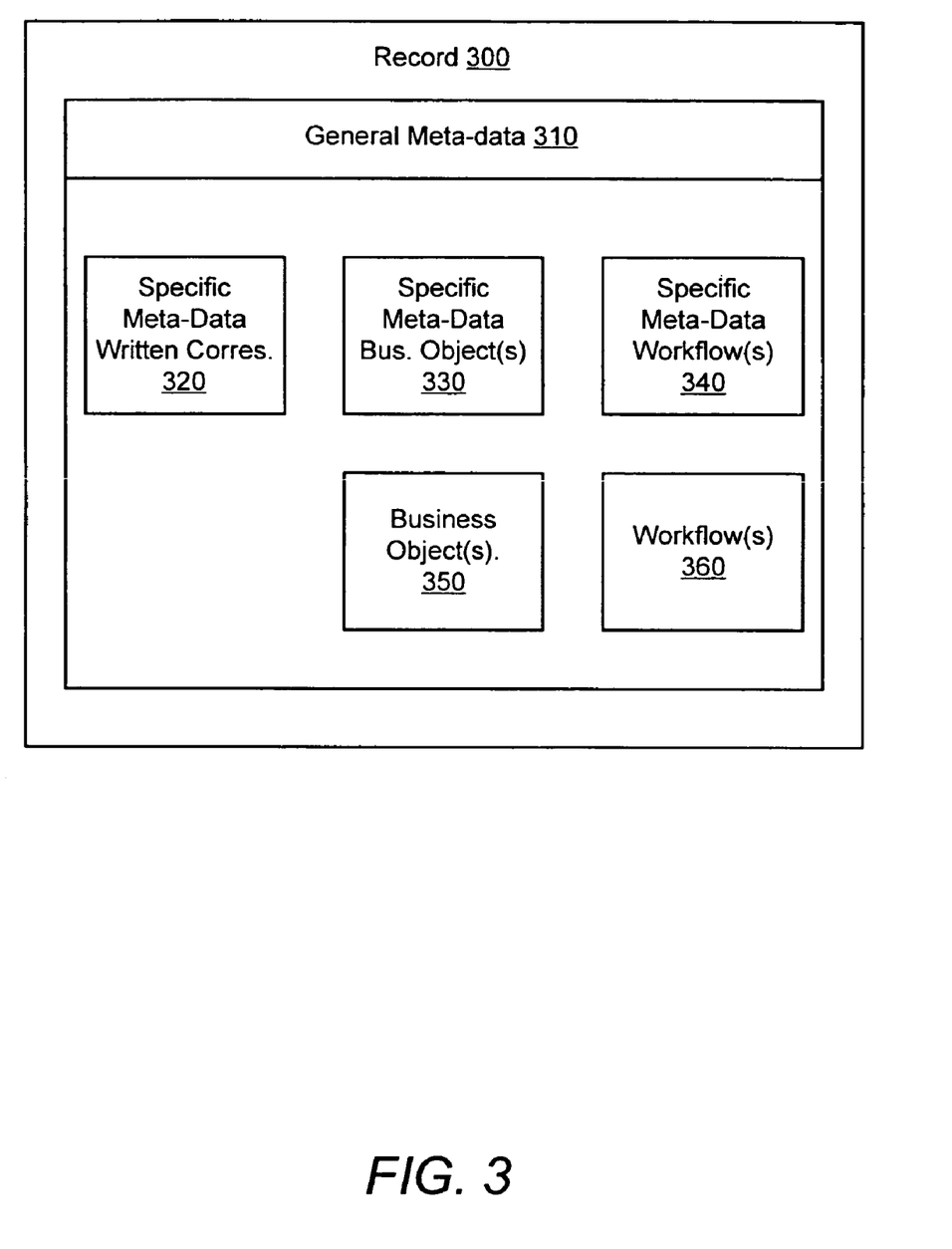
FIG. 3 is a block diagram of selected aspects of a record according to an embodiment of the invention.

FIG. 3 is a block diagram of record 300 according to an embodiment of the invention. In one embodiment, record 300 includes all of the information that documents a task from the point at which the task is started until its completion. Record 300 includes meta-data (e.g., attributes) used to manage and process the record. In one embodiment, record 300 includes general meta-data 310 and specific meta-data 320-340. General meta-data 310 is meta-data that applies generally to record 300 such as storage location, record creator, and keywords. Specific meta-data 320-340 is meta-data that is specific to an element of record 300. For example, specific meta-data 320 is meta-data that is specific to a written document that is only available in paper form. Specific meta-data 330 and 340 are, respectively, specific to business object 350 and workflow instance 360.

Figure 4:
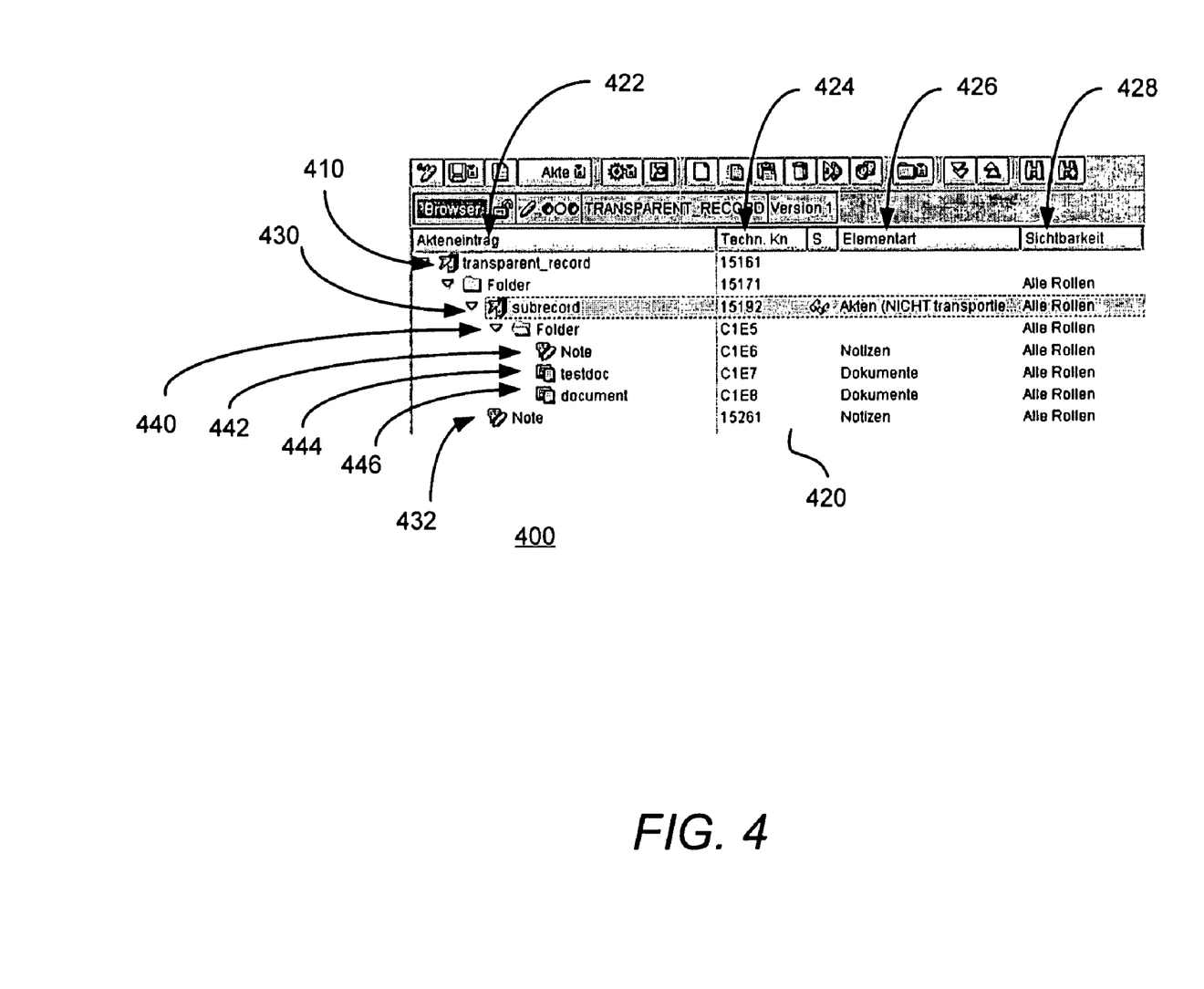
FIG. 4 is an illustration of a record browser according to an embodiment of the invention.

A number of tools may be used to administer a records management application (e.g., records management application 200, shown in FIG. 2). For example, a records model tool may be used to create and edit record models (e.g., record model 214, shown in FIG. 2). In addition, a file plan tool may be used to create and edit file plans (e.g., file plan 216, shown in FIG. 2). In one embodiment, a records browser provides a tool for displaying and editing records (e.g., record 218, shown in FIG. 2). FIG. 4 is an illustration of a record browser 400 according to an embodiment of the invention.

Record browser 400 displays record 410 in window 420. In the illustrated embodiment, window 420 includes record entry column 422, node identifier column 424, element type column 426, and visibility column 428. Record entry column 422 displays record 410. In the illustrated embodiment, record 410 is displayed as a hierarchical tree structure that is defined, for example, by a record model (e.g., record model 214, shown in FIG. 2). Node identifier column 424 displays an element identifier for each element of record 410. Element type column 426 displays an element type for the elements of record 410 (e.g., record, note, document, etc.). Visibility column 428 displays a user role for which the corresponding element is visible. User roles may be used to control access to an element of record 4.

Record 410 includes container 430. A "container" is a service provider that contains elements (e.g., a record nested within a record). For example, container 430 is a service provider that contains folder 440 and note 432. Folder 440 is an organizational element used to group other elements such as note 442 and documents 444 and 446. In an embodiment, container 430 includes one or more interfaces to allow record browser 400 to transparently display and modify the elements contained in container 430. Record browser 400 checks each element of record 410 to determine whether it implements these one or more interfaces. As is further described below, record browser 400 transparently retrieves and displays the elements of container 430 if it has the appropriate interfaces.

Figure 5:
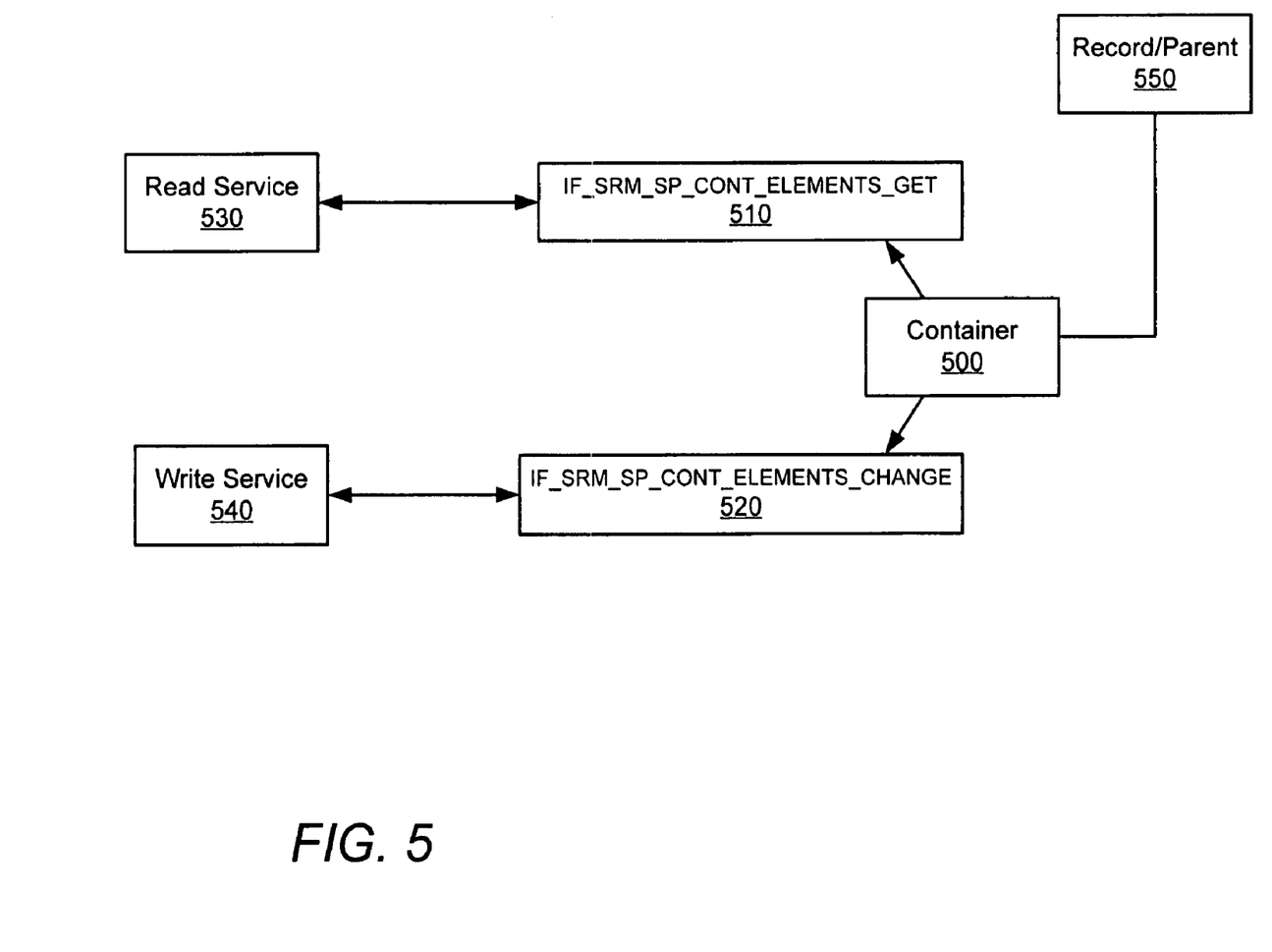
FIG. 5 is a block diagram illustrating selected aspects of a container according to an embodiment of the invention.

FIG. 5 is a block diagram illustrating selected aspects of container 500 according to an embodiment of the invention. In one embodiment, container 500 implements a set of interfaces that provide several methods to retrieve, display, and modify the elements contained in container 500. In the illustrated embodiment, container 500 implements read interface 510 and write interface 520. In an alternative embodiment, container 500 implements read interface 510 but does not implement write interface 520. In another alternative embodiment, the functionality provided by read interface 510 and write interface 520 may be distributed across more than two interfaces.

Read interface 510 includes the following methods: HAS_ELEMENTS (e.g., to determine whether the container has elements) and GET_ELEMENTS (e.g., to retrieve the elements of the container). The GET_ELEMENTS method has a handler (importing parameter IM_HANDLER) which has one or more methods to retrieve each element of container 500. Table 1 lists selected methods provided by read interface 510, according to an embodiment of the invention. In an alternative embodiment, read interface 510 may include more methods, fewer methods, and/or different methods.

TABLE 1

| Method | Description |
| --- | --- |
| CREATE_ELEMENT | This method adds an element to a collection of elements for publication. In an embodiment, it returns a reference to the element (e.g., to the IF_SRM_CONTAINER_ELEMENT interface of the element). |
| GET_LEVEL_OF_CONTAINER | This method provides the actual level of the container within the hierarchy of elements. |
| GET_PARENT_CONTAINER | This method returns the element of the parent-container (e.g., parent element 550). |
| IS_ELEMENT_CONTAINER | This method determines whether an element is another container. |
| ADD_ELEMENT | This method adds the element to the collection of elements gathered by read service 530 for publication. |

In an embodiment, read interface 510 uses the methods shown in Table 1 to retrieve each of its elements and to publish the retrieved elements. The term "publish" refers to making the elements available to read service 530, for example, to display them in a graphical user interface (e.g., record browser 400, shown in FIG. 4). Read service 530 is logic for interacting with the methods of read interface 510. In an embodiment, container 500 calls the method CREATE_ELEMENT for each of it elements that are published. The CREATE_ELEMENT method adds the called elements to a collection of elements for publication. In an embodiment, container 500 fills the newly added element by invoking one or more SET methods. Examples of SET methods that may be called include and are not limited to: SET_PARENT, SET_TYPE, SET_LEVEL, SET_ID, SET_POID, SET_IS_CONTAINER, and SET_DESCRIPTION. Listing 1 is a simplified illustration of calling an element of container 500 for publication.

LISTING 1

| | |
| --- | --- |
| element = im_handler->create_element( ) | "creates a new element |
| element->set_id( ElementID ) | "sets the ID |

-continued

LISTING 1

| | |
| --- | --- |
| element->set_type (IF_SRM_CONTAINER_ELEMENT=>C_TYPE_FOLDER) | "sets the type |
| element->set_description( ElementDescription ) | "sets the description |
| element->set_level( 1 ) | "sets the level |
| ... | "beginning with 1 |
| im_handler->add_element( element ) | "adds the element "for publication |

Figure 6:
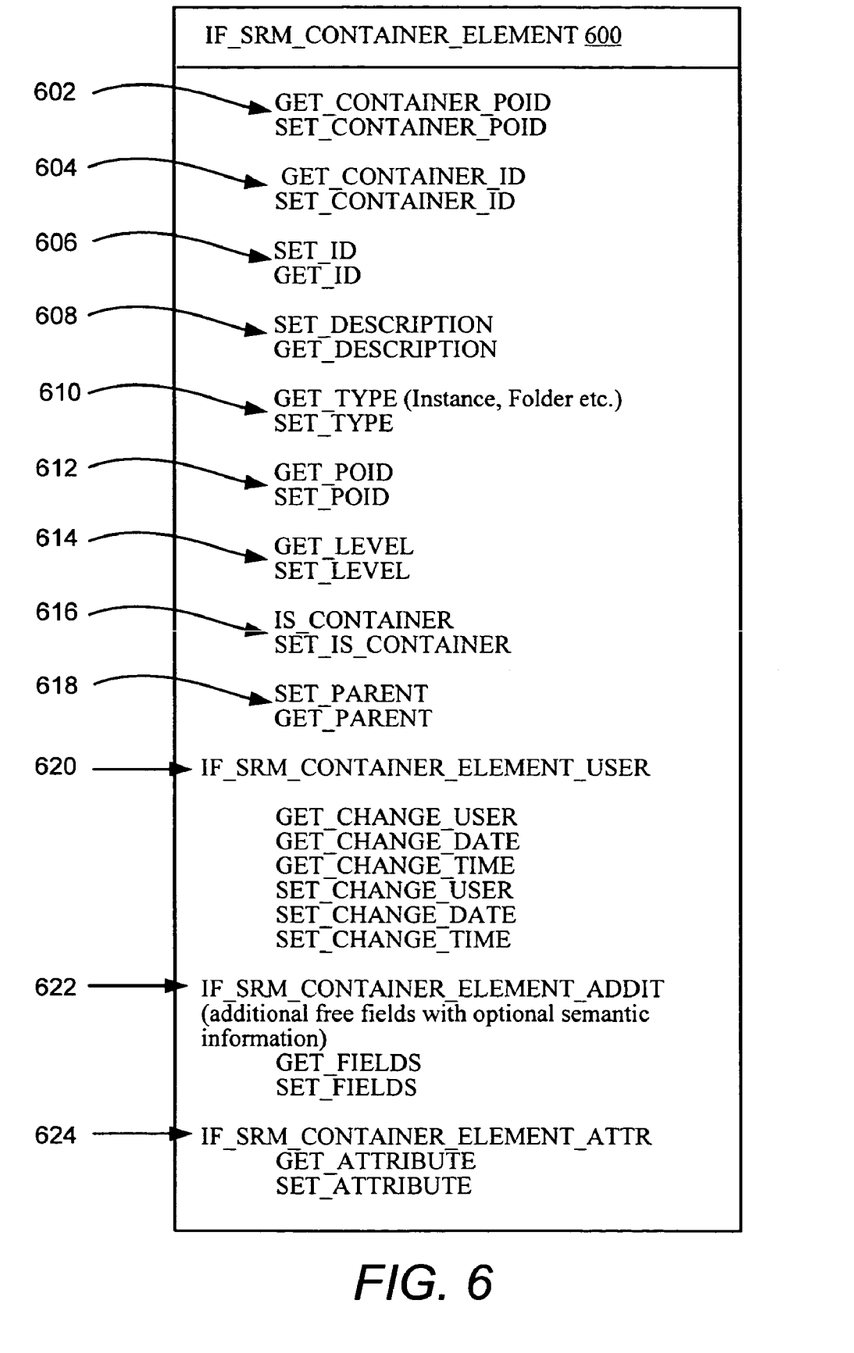
FIG. 6 is a block diagram of selected aspects of an element interface according to an embodiment of the invention.

In an embodiment, the elements of container 500 (or some of the elements of container 500) provide one or more interfaces to support publication and/or modification. The interfaces of each element include one or more methods that may be used to get and set values of the element. FIG. 6 is a block diagram of selected aspects of element interface 600 according to an embodiment of the invention. Element interface 600 includes GET/SET methods 602-618. In an embodiment, element interface includes nested interfaces (and associated methods) 620-624. Table 2 provides a description of GET/SET methods 602-618.

TABLE 2

| Method | Description |
| --- | --- |
| GET_CONTAINER_POID SET_CONTAINER_POID | These methods get and set a persistent object identifier (POID) for the container that contains the element. |
| GET_CONTAINER_ID SET_CONTAINER_ID | These methods get and set a Globally Unique ID (GUID) for the container that contains the element. |
| SET_ID GET_ID | These methods get and set a Globally Unique ID (GUID) for the element. |
| SET_DESCRIPTION GET_DESCRIPTION | These methods get and set a description for the element. |
| GET_TYPE SET_TYPE | These methods get and set an element type for the element. |
| GET_LEVEL SET_LEVEL | These methods get and set a level (e.g., within the hierarchy of the container) for the element. |
| IS_CONTAINER SET_IS_CONTAINER | These methods determine whether the element is a container. |
| SET_PARENT GET_PARENT | These methods get and set the parent element of the element. |

Referring again to FIG. 5, read service 530 retrieves the elements of container 500 through read interface 510. The retrieved elements may be displayed in a graphical user interface (e.g., elements 442-446, shown in FIG. 4). In an embodiment, read service 530 allows a user to specify a "maximum depth" for retrieving the elements of nested containers. For example, if the value of MAX_DEPTH is set to one, only the elements of the called container are retrieved. A different value for MAX_DEPTH (e.g., zero) specifies that the elements of the called container and all nested containers are to be retrieved. In one embodiment, read service 530 includes a parameter (e.g., CONTAINER_REOPEN) that specifies that the elements of a container are to be retrieved again to "refresh" the collection of elements. In an embodiment, read service 530 takes as an input a container identifier (e.g., a persistent object identifier (POID) of the container).

In an embodiment, a filter is applied to selectively remove elements from a collection of elements. The filter may implement a filter interface (e.g., IF_SRM_CONT_ELEMENT_FILTER) having one or more methods for filtering elements (e.g., FILTER_ELEMENT). In one embodiment, the filter method returns a parameter to indicate whether an element has been removed by the filter. For example a return parameter of RE_FILTER_PASS may be set to false if an element was removed and may be set to true if the element was not removed. In an embodiment, multiple filters may be applied to the elements to implement complex filtering strategies.

In an embodiment, read service 530 implements a collection interface to retrieve and process elements. The collection interface (e.g., IF_SRM_CONT_ELEMENT_COLLECT) provides one or more methods for retrieving elements. Table 3 shows the methods implemented by a collection interface in one embodiment of the invention. In alternative embodiments, the collection interface may include more methods, fewer methods, and/or different methods.

TABLE 3

| Method | Description |
| --- | --- |
| ADD_ELEMENT | This method adds an element to a collection. |
| ADD_ELEMENTS | This method adds one or more elements to the collection. |
| IS_ELEMENT_EXISTING | This method determines whether an element exists. |
| GET_ELEMENT | This method returns an element by its position. |
| GET_ELEMENTS | This method returns all elements of the collection. |
| DELETE_ELEMENT | This method deletes an element from the collection. |
| DELETE_ELEMENT_BY_POS | This method deletes an element from the collection by its position. |
| HAS_ELEMENT_CHILDREN | This method determines whether the element has "child" elements. |
| CREATE_ITERATOR | This method creates an iterator for navigating through the collection (see Table 4). |
| GET_NUMBER_OF_ELEMENTS | This method returns the number of the elements in the collection. |

In an embodiment, read service 530 implements an iterator (e.g., an iterator interface) to navigate through a collection of elements. The iterator interface (e.g., IF_SRM_CONT_ELEMENT_ITERATOR) provides one or more methods for navigating through the collection. Table 4 shows the methods implemented by an iterator interface in one embodiment of the invention. In alternative embodiments, the iterator interface may include more methods, fewer methods, and/or different methods.

TABLE 4

| Method | Description |
| --- | --- |
| RESET | This method sets the position of the iterator to the beginning of the collection. |
| HAS_NEXT | This method determines whether there is another element. |
| HAS_CHILDREN | This method determines whether the current element has children. |
| GET_NEXT | This method returns the next element. |
| SET_BY_ELEMENT | This method sets the iterator to the provided element. |
| SET_BY_POSITION | This method sets the iterator to the provided position. |
| SET_POSITION_TO_END | This method sets the iterator to its end position. |
| SET_POSITION_TO_PREVIOUS | This method sets the iterator to the predecessor element. |
| GET_POSITION | This method returns the current position of the iterator. |
| GET_COLLECTION | This method returns the collection. |
| COPY_ITERATOR | This method copies the iterator (e.g., returns a new reference). |

In an embodiment, container 500 implements write interface 520. Write interface 520 enables write service 540 to modify the collection of elements "held" by container 500. In an embodiment, write interface 520 supports adding an element to container 500 and removing an element from container 500. In alternative embodiments, more write operations, fewer write operations, and/or different write operations may be supported.

Write service 540 provides a convenient mechanism for executing write operations on container 500. In an embodiment, the process of writing to container 500 includes: opening the container, adding/deleting an element of the container, saving the changes (or allowing the changes to expire), and closing the container. The term "opening" container 500 refers to, for example, verifying that a caller is authorized to write to the container, locking the data, and the like.

In an embodiment, write interface 520 provides one or more methods for writing to container 500. Table 5 shows the methods implemented by write interface 520 in one embodiment of the invention. In alternative embodiments, write interface 520 may include more methods, fewer methods, and/or different methods.

In an embodiment, the ADD_ELEMENT_BY_REFERENCE method includes a parameter to specify the added element (e.g., IM_ELEMENT). In one embodiment, container 500 sets an identifier for the added element. Additional element attributes may be set by the caller. For example, in one embodiment, the following attributes are set by the caller: PARENT, TYPE, LEVEL, POID, IS_CONTAINER, and DESCRIPTION. The ADD_ELEMENT_BY_REFERENCE method may also provide a parameter for returning the added element (e.g., RE_ADDED_ELEMENT). In one embodiment, this feature is useful because the container sets information such as the level of the element within the hierarchy and/or a timestamp for the added element.

The ADD_ELEMENT_BY_PARENT method adds an element as a child of an existing element or as a child of the container itself. The parameters of one embodiment of the ADD_ELEMENT_BY_PARENT method are shown in Table 6. In an alternative embodiment, the method may have more parameters, fewer parameters, and/or different parameters.

TABLE 5

| Method | Description |
| --- | --- |
| OPEN | This method determines whether a caller is authorized to call the container, locks the container, and opens the container. |
| IS_ADDING_OF_ELEMS_SUPPORTED | This method determines whether the container supports adding an element to the container. |
| ADD_ELEMENT_BY_REFERENCE | This element adds an element before or after a referenced element. The parameters of this method are further discussed below. |
| ADD_ELEMENT_BY_PARENT | This method adds an element as a child of an existing element or as a child of the container itself. The parameters of this method are further discussed below. |
| IS_DELETING_OF_ELEMS_SUPPORTED | This method determines whether the deletion of elements is supported. |
| DELETE_ELEMENT | This method deletes an element from the container. |
| GET_MESSAGE | In an embodiment, container 500 can provide messages to a caller (e.g., after a write operation). This method obtains a message from the container. |
| SAVE | This method saves changes that have been made to the container. |
| CLOSE | This method closes the container. |

The ADD_ELEMENT_BY_REFERENCE method adds an element before or after a referenced element. In an embodiment, the method includes a parameter (e.g., IM_REFERENCE_ELEMENT_ID) to identify the referenced element. In addition, the method includes a parameter to specify whether the element is to be added before or after the referenced element. For example, if an IM_ADD_BEFORE parameter is set to true, then the new element is added before the referenced element within the hierarchy of container elements.

TABLE 6

| Parameters | Description |
| --- | --- |
| IM_PARENT_ELEMENT_ID | This parameter specifies a parent element and may have an initial value if the parent is the container itself. |
| IM_ELEMENT | This parameter specifies the element to be added to the container. |
| IM_COLLECTION_ELEMENTS | This parameter contains elements used by a caller. |
| RE_ADDED_ELEMENT_INFO | This parameter returns information about the added element. |

The RE_ADDED_ELEMENT_INFO parameter returns information about the added element. In an embodiment, the returned information includes an ELEMENT component to represent the added element and a PREDECESSOR_ELEMENT_ID component to reference an element that is a predecessor of the added element. In this context, the predecessor element is in the same hierarchical level as the added element and, therefore, the parent of the added element is not a predecessor element. If no predecessor element exists, then the value of PREDECESSOR_ELEMENT_ID may be set to an initial value.

In one embodiment, container 500 only returns a predecessor element that is known to the caller. The set of elements that is known to a caller may be smaller than the set of elements held in the container because a filter may be used to filter out elements retrieved by the caller. The parameter IM_COLLECTION_ELEMENTS contains elements used by the caller. In an embodiment, Container 500 determines whether a predecessor element is known to the caller by determining whether the predecessor element is a member of IM_COLLECTION_ELEMENTS. For example, container 500 may call IM_COLLECTION_ELEMENTS->IS_ELEMENT_EXISTING and provide the container identifier to determine whether a predecessor element is a member of IM_COLLECTION_ELEMENTS. If the predecessor element is not a member of IM_COLLECTION_ELEMENTS, then container 500 may select a different predecessor element and determine whether it is known to the caller. This process may continue until the container finds a predecessor element that is known to the caller.

Figure 7:
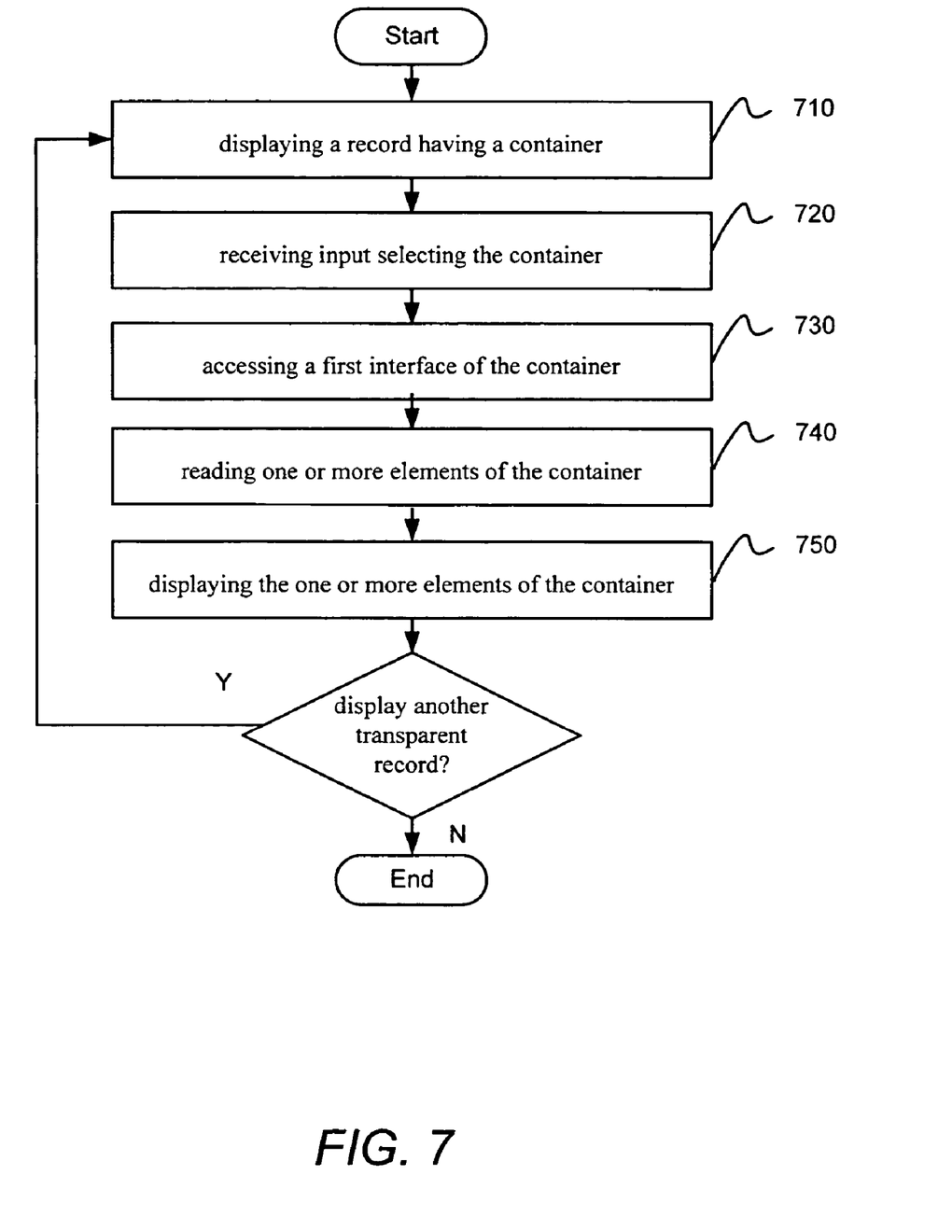
FIG. 7 is a flow diagram illustrating certain aspects of a method for a transparent record, according to an embodiment of the invention.

Turning now to FIGS. 7, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. in addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for a transparent record, according to an embodiment of the invention. Referring to process block 710, a graphical user interface (e.g., record browser 400, shown in FIG. 4) displays a record (e.g., record 410) having one or more elements. In an embodiment, at least one of the elements of the displayed record is a container (e.g., container 430). The container, in turn, includes one or more elements (e.g., documents, workflow instances, other containers, etc.).

Referring to process block 720, the record browser receives input selecting the displayed container. In an embodiment, "receiving input selecting the container" refers to receiving an indication from a pointing device that the container has been selected. Similarly, "receiving input" may refer to receiving an indication from a keyboard, touch screen, propagated signal, and the like.

Referring to process block 730, an abstract identifier for the container (e.g., a POID) is received by a read service (e.g., read service 530, shown in FIG. 5). The read service is instantiated, for example, by a factory. The term "read service" refers to logic (e.g., software) that accesses containers through an appropriate interface (e.g., read interface 510, shown in FIG. 5). In an embodiment, the read service accesses a first interface (e.g., read interface 510, shown in FIG. 5) of the container specified by the identifier.

Referring to process block 740, the read service (e.g., read service 530, shown in FIG. 5) reads one or more elements of the container. In one embodiment, the read service accesses element meta-data (e.g., meta-data 330 and 340, shown in FIG. 3) using, for example, one or more GET methods. Examples of element meta-data include and are not limited to: an element identifier, a container identifier, an element type, and a persistent object identifier (POID). In one embodiment, the read service checks each element of the container to determine whether it is a nested container (e.g., using a method such as the IS_ELEMENT_CONTAINER method). If the element is a nested container, then the read service may recursively read the elements of the nested container.

Referring to process block 750, one or more elements of the container are displayed in the graphical user interface (e.g., record browser 400, shown in FIG. 4). In an embodiment, the process of reading the container elements is transparent to the user. That is, the user provides input selecting a container and a graphical representation of the elements of the container is displayed. Thus, embodiments of the invention enable a user to transparently navigate through the element structure of a record having one or more containers.

Figure 8:
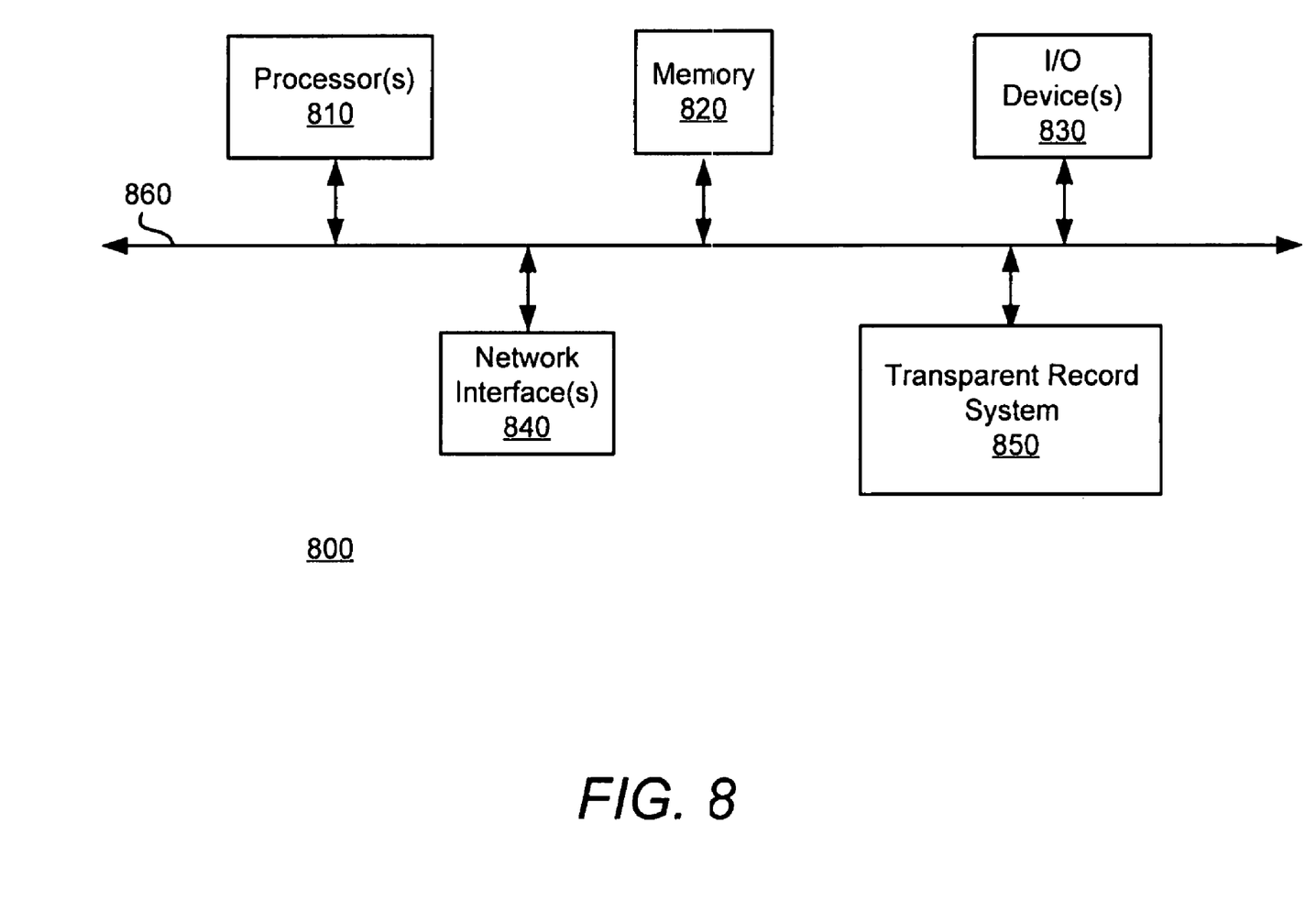
FIG. 8 is a block diagram of a node implemented according to an embodiment of the invention.

FIG. 8 is a block diagram of node 800 implemented according to an embodiment of the invention. Node 800 may include: processor(s) 810, memory 820, one or more Input/Output devices 830, network interface(s) 840, and transparent record system 850. The illustrated elements may be connected together through system interconnection 860. Processor(s) 810 may include a microprocessor, microcontroller, field programmable gate array (FPGA), application specific integrated circuit (ASIC), central processing unit (CPU), programmable logic device (PLD), and similar devices that access instructions from system storage (e.g., memory 820), decode them, and execute those instructions by performing arithmetic and logical operations.

Transparent record system 850 enables a user of node 800 to transparently navigate through the element structure of a record. Transparent record system 850 may be executable content, control logic (e.g., ASIC, PLD, FPGA, etc.), firmware, or some combination thereof, in an embodiment of the invention. In embodiments of the invention in which transparent record system 850 is executable content, it may be stored in memory 820 and executed by processor(s) 810.

Memory 820 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 820 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 820 may store program modules such as routines, programs, objects, images, data structures, program data, and other program modules that perform particular tasks or implement particular abstract data types that facilitate system use.

One or more I/O devices 830 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 860 permits communication between the various elements of node 800. System interconnection 860 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable storage medium for storing the machine-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable storage media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for processing a record comprising:
   receiving input selecting a container of the record, the container having elements of the record:
   accessing a first interface of the selected container coupled with a read service, in response to receiving the input;
   determining, by the read service, at least one of the elements is a nested container containing further elements;
   receiving user input specifying a maximum depth for retrieving the elements of the nested container;
   implementing, by the read service, an iterator to navigate through the elements of the nested container, in response to the determining, and through the elements of the container;
   recursively reading, by the read service, the elements of the nested container and the elements of the container, the recursive reading based on the specified maximum depth;
   if the maximum depth is specified to a one then only the elements of the selected container are recursively read by the read service, and wherein
   if the maximum depth is specified to a zero then the elements of the selected container including the elements of the nested container within the selected container are recursively read by the read service;
   publishing the recursively read elements for display in a graphical user interface; and
   displaying the published recursively read elements of the record on the graphical user interface.

2. The method of clam 1, wherein reading the elements of the container with the read service comprises:
   accessing meta-data for each of the elements.

3. The method of claim 2, wherein accessing meta-data for each of the elements comprises accessing, for each of the elements, at least one of:
   an element identifier;
   a container identifier of the container;
   an element type; and
   a persistent object identifier.

4. The method of clam 1, wherein displaying the elements of the container on the graphical user interface comprises:
   displaying an element on the graphical user interface, if the element is not removed by a filter.

5. The method of claim 1, further comprising:
   accessing a second interface of the container; and
   modifying the container with the second interface.

6. The method of claim 5, wherein modifying the container comprises at least one of:
   adding an element to the container; and
   deleting an element from the container.

7. The method of claim 6, wherein adding the element to the container further comprises:
   opening the container;
   providing one or more attributes to define the element;
   saving the container; and
   closing the container.

8. The method of claim 7, wherein opening the container comprises at least one of:
   determining whether there is authority to open the container; and
   locking the container.

9. An apparatus comprising:
   a graphical user interface; and
   a processor and logic executable thereon to;:
   receive input selecting a container of the record, the container having elements of the record;
   access a first interface of the selected container coupled with a read service, in response to receiving the input,
   determine, by the read service, at least one of the elements is a nested container containing further elements;
   receive user input specifying a maximum depth for retrieving the elements of the nested container;
   implement, by the read service, an iterator to navigate through the elements of the nested container, in response to the determining, and through the elements of the container;

recursively read, by the read service, the elements of the nested container and the elements of the container, the recursive reading based on the specified maximum depth;

if the maximum depth is specified to a one then only the elements of the selected container are recursively read by the read service, and wherein if the maximum depth is specified to a zero then the elements of the selected container including the elements of the nested container within the selected container are recursively read by the read service;

publish the recursively read elements for display in a graphical user interface; and display the published recursively read elements of the record on the graphical user interface.

10. The apparatus of claim 9, wherein the logic executable thereon to read the elements of the container comprises logic to:

access meta-data for each of the elements.

11. The apparatus of claim 10, wherein the logic executable thereon to access meta-data for each of the elements comprises logic to access at least one of:

an element identifier;
a container identifier of the container;
an element type; and
a persistent object identifier.

12. The apparatus of claim 9, wherein the logic executable thereon further comprises logic to:

access a second interface of the container; and
modify the container with the second interface.

13. The apparatus of claim 12, wherein the logic executable thereon to modify the container comprises logic to:

add an element to the container.

14. The apparatus of claim 13, wherein the logic executable thereon to add the element to the container comprises logic to:

open the container;
provide one or more attributes to define the element;
save the container; and
close the container.

15. The apparatus of claim 9, wherein the logic executable thereon to display the elements of the container on the graphical user interface comprises logic to:

display an element on the graphical user interface, if the element is not removed by a filter.

16. A system comprising:

means for receiving input selecting a container of a record, the container having elements of the record;
means for accessing a first interface of the selected container coupled with a read service, in response to receiving the input;
means for determining, by the read service, at least one of the elements is a nested container containing further elements;
means for receiving user input specifying a maximum depth for retrieving the elements of the nester container;
means for implementing, by the read service, an iterator to navigate through the elements of the nested container, in response to the determining, and through the elements of the container;
means for recursively reading, by the read service, the elements of the nested container and the elements of the container, the recursive reading based on the specified maximum depth;
if the maximum depth is specified to a one then only the elements of the selected container are recursively read by the read service, and wherein
if the maximum depth is specified to a zero then the elements of the selected container including the elements of the nested container within the selected container are recursively read by the read service:
means for publishing the recursively read elements for display in a graphical user interface; and
means for displaying the published recursively read elements of the record on the graphical user interface.

17. The system of claim 16, wherein the means for reading the elements of the container with the read service associated with the interface comprises:

means for accessing meta-data for each of the elements.

18. The system of claim 17, wherein the means for accessing meta-data for each of the elements comprises means for accessing at least one of:

an element identifier;
a container identifier of the container;
an element type; and
a persistent object identifier.

19. The system of claim 16, further comprising:

means for accessing a second interface of the container; and
means for modifying the container with the second interface.

20. The system of claim 19, wherein the means for modifying the container comprises at least one of:

means for adding an element to the container; and
means for deleting an element from the container.

21. The system of claim 20, wherein the means for adding the element to the container comprises:

means for opening the container;
means for providing one or more attributes to define the element;
means for saving the container; and
means for closing the container.

22. The system of claim 20, wherein the means for displaying the one or more elements of the container on the graphical user interface comprises:

means for displaying an element on the graphical user interface, if the element is not removed by a filter.

23. An article of manufacture comprising:

a machine-readable storage medium providing instructions that, when executed by an apparatus, cause the apparatus to:
receive input selecting a container of a record, the container having elements of the record;
access a first interface of the selected container coupled with a read service, in response to receiving the input;
determine, by the read service, at least one of the elements is a nested container containing further elements;
receive user input specifying a maximum depth for retrieving the elements of the nested container;
implement, by the read service, an iterator to navigate through the elements of the nested container, in response to the determining, and through the elements of the container;
recursively read, by the read service, the elements of the container and the elements of the container, the recursive reading based on the specified maximum depth;
if the maximum depth is specified to a one then only the elements of the selected container are recursively read by the read service, and wherein
if the maximum depth is specified to a zero then the elements of the selected container including the elements of the nested container within the selected container are recursively read by the read service:

publish the recursively read elements for display in a graphical user interface; and display the published recursively read elements of the record on the graphical user interface 24. The article of manufacture of claim 23, wherein the instructions that, when executed by the apparatus, cause the apparatus to read the elements of the container with the read service associated with the first interface cause the apparatus to:

access meta-data for each of the elements.

25. The article of manufacture of claim 24, wherein the instructions that, when executed by the apparatus, cause the apparatus to access meta-data for each of the elements cause the apparatus to access at least one of:

an element identifier;

a container identifier of the container;

an element type; and a persistent object identifier.

26. The article of manufacture of claim 23, wherein the electronically accessible medium provides further instructions that, when executed by the apparatus, cause the apparatus to:

access a second interface of the container; and modify the container with the second interface.

27. The article of manufacture of claim 26, wherein the instructions that, when executed by the apparatus, cause the apparatus to modify the container cause the apparatus to:

add an element to the container.

28. The article of manufacture of claim 27, wherein the instructions that, when executed by the apparatus, cause the apparatus to add the element to the container cause the apparatus to:

open the container;

provide one or more attributes to define the element;

save the container; and close the container.

29. The article of manufacture of claim 28, wherein the instructions that, when executed by the apparatus, cause the apparatus to open the container cause the apparatus to:

determine whether there is authority to open the container; and lock the container.

30. The article of manufacture of claim 23, wherein the instructions that, when executed by the apparatus, cause the apparatus to:

display an element on the graphical user interface, if the element is not removed by a filter.

* * * * *